Sept. 20, 1960      E. M. SCHMIDT      2,953,735
POLYPHASE STATIC INVERTER
Filed June 30, 1958      3 Sheets-Sheet 1
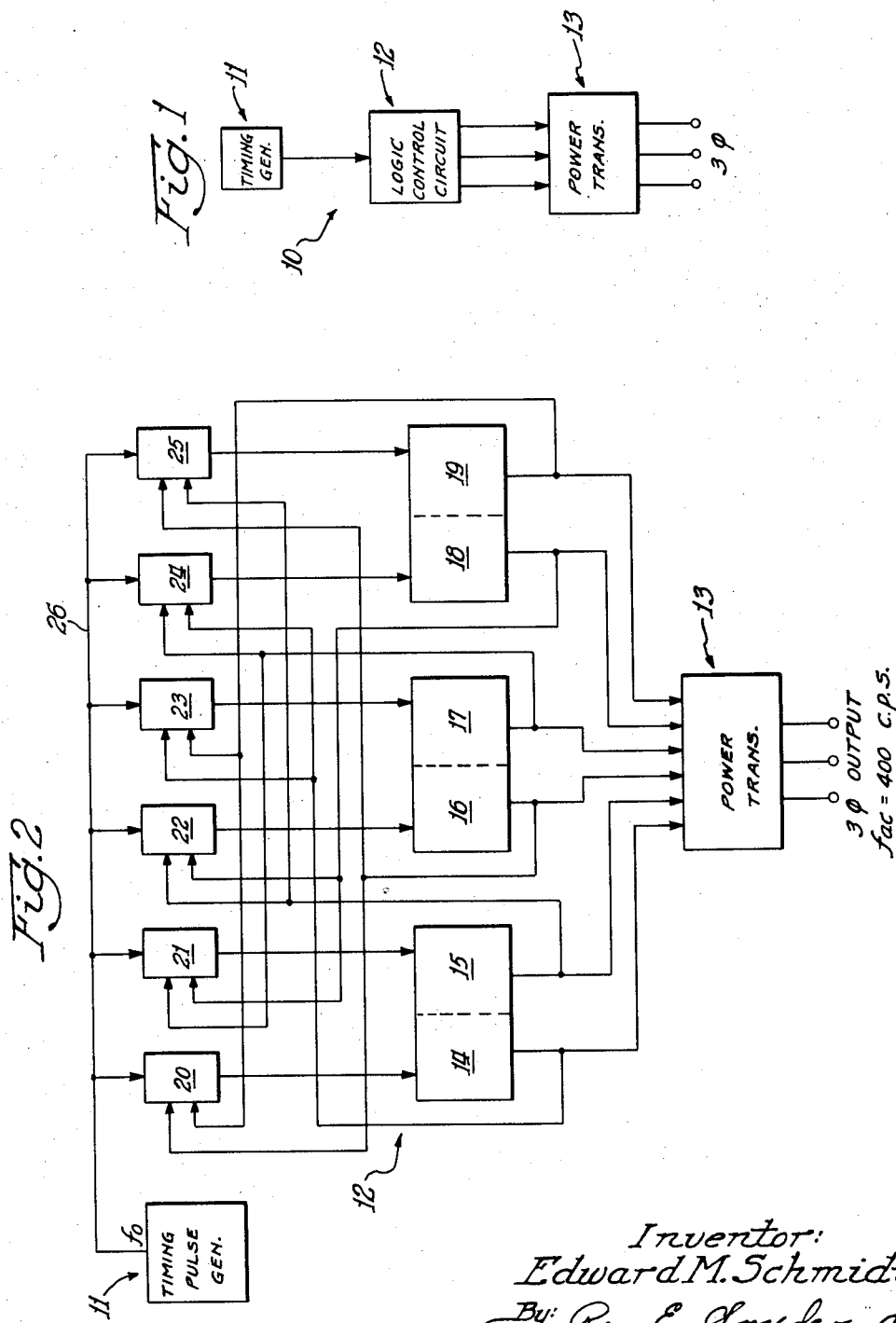
Inventor:
Edward M. Schmidt
By: Ray E. Snyder Atty.

Sept. 20, 1960      E. M. SCHMIDT      2,953,735
POLYPHASE STATIC INVERTER
Filed June 30, 1958      3 Sheets-Sheet 2
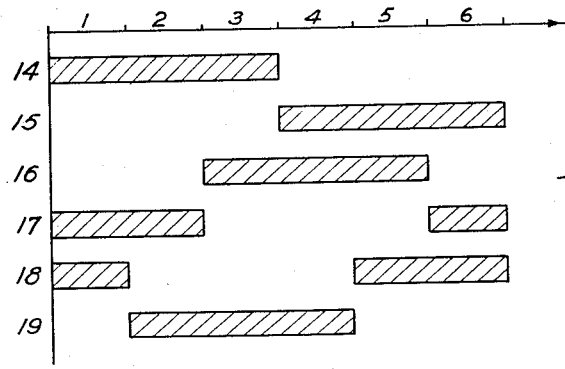
Fig.3
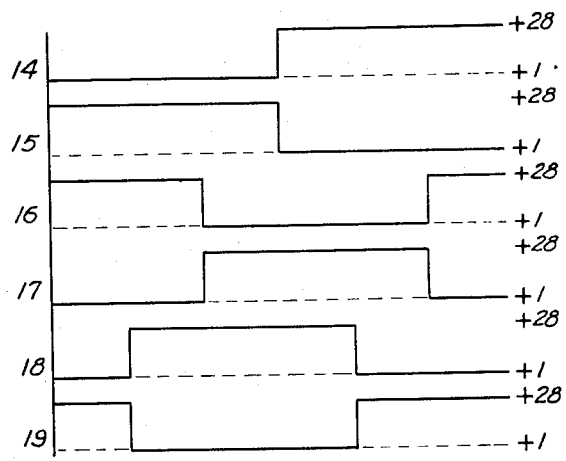
Fig.4
| | START | 1 | 2 | 3 | 4 | 5 | 6 |
|---|---|---|---|---|---|---|---|
| 14 | OFF | ON | ON | ON | OFF | OFF | OFF |
| 15 | ON | OFF | OFF | OFF | ON | ON | ON |
| 16 | OFF | OFF | OFF | ON | ON | ON | OFF |
| 17 | ON | ON | ON | OFF | OFF | OFF | ON |
| 18 | ON | ON | OFF | OFF | OFF | ON | ON |
| 19 | OFF | OFF | ON | ON | ON | OFF | OFF |
Fig.5
Inventor:
Edward M. Schmidt
By: Ray E. Snyder Atty.

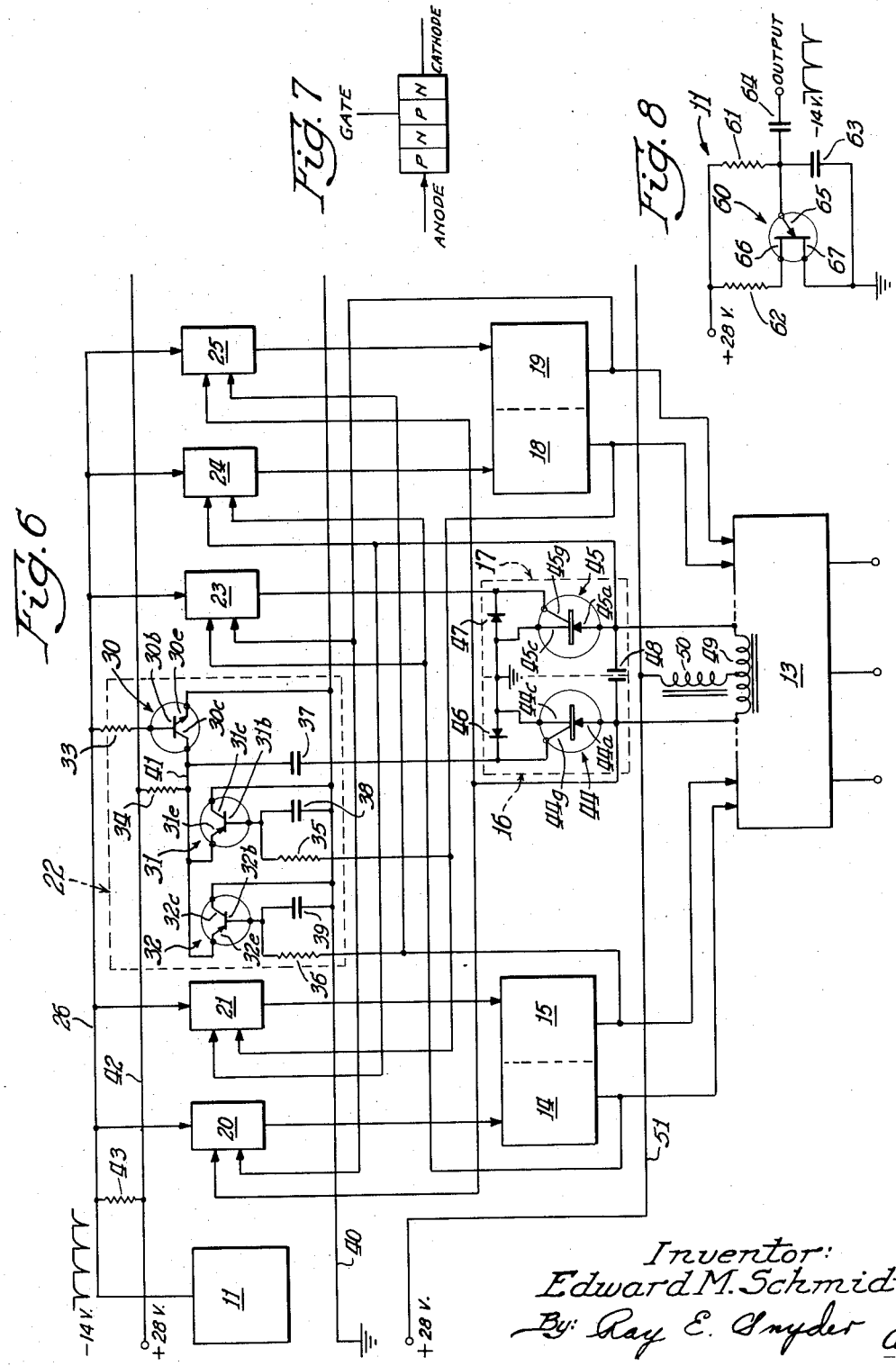

United States Patent Office 2,953,735
Patented Sept. 20, 1960

2,953,735
POLYPHASE STATIC INVERTER

Edward M. Schmidt, Chicago, Ill., assignor to Borg-Warner Corporation, Chicago, Ill., a corporation of Illinois Filed June 30, 1958, Ser. No. 745,412
8 Claims. (Cl. 321—5)

This invention relates to a static inverter for producing a polyphase alternating current voltage from a direct current source.

Inverters of the vibratory and rotary types are well known in the art. These inverters are known to work satisfactorily for certain applications; however, they have several inherent limitations. Some of these limitations are: low efficiency and excessive weight per watt of power output; they are affected by changes in temperature and environment; the frequency and phase are unstable and are affected by changes in load; and because of their moving parts, they require considerable maintenance.

It is an object to provide a static inverter of comparatively light weight that is maintenance free and is unaffected by ordinary environmental changes.

It is another object to provide a static inverter having stable frequency and phase characteristics that are unaffected by fluctuations in load conditions.

It is another object to provide a static inverter employing a timing generator and a logic control circuit for converting a D.C. voltage to a polyphase A.C. voltage.

It is still another object to provide a static inverter employing a plurality of controlled rectifier transistors, a plurality of gate circuits for controlling the conduction of the rectifiers, and a timing pulse generator for controlling the switching sequence of the gate circuits.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Fig. 1 is a general block diagram of the static inverter of the present invention, including a timing pulse generator and a logic control circuit;

Fig. 2 is a block diagram of the logic control circuit of Fig. 1 including a plurality of controlled rectifiers and a plurality of gate circuits;

Fig. 3 is a graph of the conduction sequence of the controlled rectifiers of Fig. 2;

Fig. 4 is a graph of the voltage at the output of each of the controlled rectifiers for a resistive load;

Fig. 5 is a table of the switching sequence of the controlled rectifiers;

Fig. 6 is a schematic diagram of portions of the logic control circuit superimposed on the block diagram of Fig. 2;

Fig. 7 is a block illustration of the construction and of the leads to the controlled rectifier transistors; and Fig. 8 is a schematic diagram of the timing pulse generator.

Like characters of reference designate like parts in the several views.

The static inverter of the present invention, shown in Fig. 1, is designated generally by the numeral 10, and comprises a timing pulse generator 11, a logic control circuit 12, and a power transformer 13.

Referring to Fig. 2, there is illustrated an enlarged block diagram of the logic control circuit 12. The logic control circuit 12 comprises three pairs of controlled rectifiers, 14 and 15, 16 and 17, and 18 and 19, and six "and" gate circuits 20, 21, 22, 23, 24, and 25. Each of the controlled rectifiers 14–19 has a single input and a single output. Each of the "and" gate circuits has three inputs and one output. One input to each of the "and" gates 20–25 is connected through a common timing line 26 to the timing generator 11. The output of the "and" gate 20 is connected to the input the rectifier 14; the output of 21 is connected to the input of 15; the output of 22 is connected to the input of 16; the output of 23 is connected to the input of 17; the output of 24 is connected to the input of 18; and the output of 25 is connected to the input of 19.

The output of the rectifier 14 is connected to one input of the power transformer 13 and to one rectifier input of each of the "and" circuits 23 and 24. The output of the rectifier 15 is connected to a second input of the power transformer 13 and to one rectifier input of each of the "and" gates 22 and 25. The output of the rectifier 16 is connected to a third input of the power transformer 13 and to one rectifier input of each of the "and" gates 20 and 25. The output of the rectifier 17 is connected to a fourth input of the power transformer 13 and to one rectifier input of each of the "and" gates 21 and 24. The output of the rectifier 18 is connected to a fifth input of the power transformer 13 and to one rectifier input of each of the "and" gates 21 and 22. The output of the rectifier 19 is connected to a sixth input of the power transformer 13 and to one rectifier input of each of the "and" gates 20 and 23.

The timing pulse generator 11 functions to supply a series of spiked pulses simultaneously to the timing input of each of the "and" gates 20–25. The frequency output of the generator 11, for the present embodiment, is six times the desired output frequency. For example, if the desired output frequency $f_{ac}$ is to be 400 c.p.s., the frequency $f_0$ of the pulse generator should be 2400 c.p.s.

In an operative condition, one of each of the pairs of rectifiers 14 and 15, 16 and 17, and 18 and 19, is on and the other is off. An incoming pulse to one of the rectifiers 14–19 is effective to switch it from off to on. If the rectifier is already on, the incoming pulse has no effect. The pairs of rectifiers are interconnected so that switching one rectifier from off to on simultaneously switches the other of that pair from on to off. An output signal from a particular rectifier is obtained only when off. This output signal is in the form of a positive D.C. voltage level and is applied to an input of the power transformer 13 and to the inputs of two of the "and" gates 20–25. When two such signals are applied to the two rectifier inputs of a particular "and" gate, the next pulse from the timing generator is effective to trigger the "and" gate, and a pulse is transmitted to the input of the respective rectifier.

Referring to Fig. 3, there is illustrated a graph of the conduction sequence of the controlled rectifiers 14–19 for a series of six time intervals. These time intervals correspond to the periods between pulses from the timing generator 11. The series of six intervals represents a complete cycle of the conduction sequence, and it is to be understood that this sequence is repeated for an indefinite time. It is to be noted from this graph that the rectifier 14 conducts for the first three intervals and is off for the remaining three intervals. The rectifier 15 is off for the first three intervals and is on for the fourth through the sixth interval. Considering the six pulse cycle to correspond to 360° of rotation, the conduction periods of the rectifiers 14 and 15 are 180° out of phase with each other.

The rectifier 16 conducts for the third through the fifth intervals; the rectifier 17 conducts for the first two intervals and for the sixth interval; the rectifier 18 conducts for the first interval and for the fifth and sixth intervals; and the rectifier 19 conducts for the second through the fourth intervals. From this sequence, it is to be noted that the conduction periods of the rectifiers 14, 16, and 18 are 120° out of phase with each other. Similarly, the conduction periods of the rectifiers 15, 17, and 19 are 120° out of phase with each other.

The graph of Fig. 4 illustrates the voltage level at the output of each of the rectifiers 14–19 during the six pulse sequence, corresponding to the conduction sequence shown on the graph of Fig. 3. A resistive load is assumed to be connected to the outputs in order to simplify a discussion of the operation.

The table shown in Fig. 5 sets forth the operative condition of each of the rectifiers 14–19 for the six pulse sequence, and also indicates the switching sequence for each of the rectifiers.

Assuming the conditions to be shown at "start," the rectifier 14 is off and 15 is on, 16 is off and 17 is on, and 18 is on and 19 is off. With 16 off, a signal is applied from its output to one rectifier input of the "and" gate 20. The rectifier 19 is also off and a signal is supplied from its output to the second rectifier input of the "and" gate 20. The "and" gate 20 thus is in condition to conduct when a pulse is supplied from the timing line 26 to the timing input. The first pulse from timing generator 11 triggers the "and" gate 20 into conduction and this pulse is transmitted to the rectifier 14, switching it from off to on. Switching 14 on simultaneously switches 15 off, and a signal then is supplied from the output of 15 to one rectifier input of the "and" gate 25. The rectifier 16 was off from the "start" condition, and a signal is supplied from its output to the second rectifier input of the "and" gate 25. The "and" gate 25 thus is in condition to conduct, and when the second pulse from the timing line 26 arrives, this pulse is transmitted through the "and" gate 25 to the rectifier 19, switching it from off to on. Switching 19 on switches 18 off and a signal is supplied from the output of 18 to one rectifier input of the "and" gate 22. A second signal is supplied to the "and" gate 22 from the output of the rectifier 15 which was switched off by the first pulse, thereby conditioning the "and" gate 22 for conduction. When the third pulse from the timing line 26 arrives, this pulse is effective to switch the rectifier 16 from off to on. Switching 16 on has the effect of switching 17 off and a signal then is supplied from the output of 17 to one rectifier input of the "and" gate 21. A second rectifier input signal is supplied from 18 which was switched off by the second pulse. The "and" gate 21 thus is in condition to conduct and when the fourth pulse arrives from the timing line 26, this pulse is transmitted through the "and" gate 21 and switches the rectifier 15 from off to on. The switching sequence for the remainder of the cycle should be apparent from the description just given.

The signals fed back to the "and" gates are also supplied to the inputs of the power transformer 13 in the sequence set forth above. As previously noted, the conduction sequences of the rectifiers 14 and 15 are 180° out of phase with each other and 120° out of phase with the conduction sequences of the rectifiers 16 and 17, and 18 and 19, respectively. Each pair of rectifiers, therefore, operates in a push-pull fashion in supplying an input voltage to the power transformer 13, and a three phase A.C. voltage is developed at the output of the power transformer 13. The voltage waves shown in Fig. 4 are distorted because of the induction of the transformer 13 as will be described hereinafter.

Referring to Fig. 6, there is illustrated a schematic diagram of the "and" gate circuit 22 and of the controlled rectifier circuits 16 and 17, superimposed on the block diagram of Fig. 2. The "and" gate 22 is seen to comprise transistors 30, 31, and 32; resistors 33, 34, 35, and 36; and capacitors 37, 38, and 39. The transistor 30 is of the NPN-type and has a base 30b, a collector 30c, and an emitter 30e. Each of the transistors 31 and 32 is of the PNP-type and has a base, collector, and emitter similarly designated. The base 30b is connected through the resistor 33 to the timing line 26. The emitter 30e is connected to a ground line 40. The collector 30c is connected to a common tie-line 41, and through the capacitor 37 to the input of the controlled rectifier 16. The tie-line 41 is connected through resistor 34, which acts as a load resistor, to a positive 28 volt D.C. line, designated generally by the numeral 42. The D.C. line 42 is also connected to the timing line 26 through a bias resistor 43.

The collector 31c is connected to the ground line 40 and the emitter 31e is connected to the tie-line 41. One side of the capacitor 38 is connected to the base 31b, and the other side is connected to the ground line 40. One end of the resistor 35 is connected to the base 31b, and the other end is connected to the output of the rectifier 18. The collector 32c is connected to the ground line 40, and the emitter 32e is connected to the tie-line 41. One side of the capacitor 39 is connected to the base 32b, and the other side is connected to the ground line 40. One end of the resistor 36 is connected to the base 32b, the other end is connected to the output of the rectifier 15.

The controlled rectifiers 16 and 17 comprise controlled rectifier-type transistors 44 and 45, crystal diodes 46 and 47, respectively, and a coupling capacitor 48. The transistor 44 has an anode 44a, a cathode 44c, and a gate 44g. Similarly, the transistor 45 has an anode 45a, a cathode 45c, and a gate 45g. The gate 44g is connected to the output of the "and" gate 22 and to the cathode of the crystal diode 46. The cathode 44c is connected to the anode of the crystal diode 46 and to ground. The gate 45g is connected to the output of the "and" gate 23 and to the cathode of the crystal diode 47. The cathode 45c is connected to the anode of the crystal diode 47 and to ground. The anodes 44a and 45a are coupled together through the capacitor 48. The anode 44a is also connected to one rectifier input of each of the "and" gates 20 and 25 and to one end of a primary winding 49 of the power transformer 13. The anode 45a is connected to one rectifier input of each of the "and" gates 21 and 24 and to the other end of the primary winding 49. A center tap of the primary winding 49 is connected through a shaping coil 50 to a positive 28 volt D.C. line 51.

In operation, the circuits just described function as follows:

Assume that signals are applied simultaneously from the outputs of the controlled rectifiers 15 and 18, respectively, to the two rectifier inputs of the "and" gate 22, as would be the case, for example, during the second interval of Fig. 5. The input signals from the controlled rectifiers 15 and 18 are effective to cut off both of the transistors 31 and 32 as will be described subsequently. The transistor 30 is normally in a state of conduction, that is, current flows from the D.C. power line 42 through the resistor 34, tie-line 41, collector 30c, the emitter 30e, to the ground line 40. While the transistor 30 is conducting, the voltage on the tie-line 41 is comparatively low, because of the low internal resistance between the collector 30c and the emitter 30e. Most of the 28 volt difference between the power line 42 and the ground line 40 appears across resistor 34.

The pulses supplied from the timing line preferably are negative and may have a peak value of approximately −14 volts. One of these negative pulses applied through the resistor 33 to the base 30b is effective to cut off the transistor 30. The voltage on the tie-line 41 promptly increases during the time that the transistor 30 is cut off. This sudden increase in voltage takes the form of a positive pulse which is applied through the capacitor 37 to the gate 44g of the transistor 44. This incoming pulse is effective to trigger the transistor 44 into conduction, and current flows from the power line 51 through the coil 50, the primary winding 49, the anode 44a, and the cathode 44c to ground.

When the rectifier 44 is conducting, the voltage at the anode 44a drops to a comparatively low value, e.g., one or two volts positive. The sudden drop in voltage at the anode 44a is transmitted through the coupling capacitor 48 to the anode 45a of the controlled rectifier 17. This drop in voltage is effective to cut off the conduction of the transistor 45. After the transistor 45 has been cut off, the voltage at the anode 45 tends to increase to approximately 56 volts, that is, twice the D.C. line voltage on line 51. The apparent doubling of D.C. line voltage is caused by the voltage induced in the other half of the primary winding 49. This increased positive voltage constitutes the output signal and is transmitted to one rectifier input of each of the "and" gates 21 and 24. The controlled rectifiers 16 and 17 remain in this operative condition until a pulse is supplied from the "and" gate 23 to the input of the controlled rectifier 17 to switch it on again.

The voltages applied to the bases 31b and 32b of the transistors 31 and 32 respectively are thus seen to be positive D.C. voltage levels of approximately 28 to 56 volts and one volt. Insofar as the operation of the transistors 31 and 32 are involved, it does not matter whether the larger voltage is 28 or 56 volts. When only one volt is applied to the base 31b, i.e., a no signal condition, current flows from the power line 42 through the resistor 34, the tie-line 41, the emitter 31e, and the collector 31c to the ground line 40. When either of the transistors 31 and 32 is so conducting, the voltage on the tie-line 41 is comparatively low, and cutting off the conduction of the transistor 30 and only one of the transistors 31 or 32 does not affect this voltage on the tie-line 41. Consequently, no pulse is supplied through the capacitor 37 to the controlled rectifier 16 unless all of the transistors 31 and 32 are simultaneously cut off. Applying the high voltage signal, i.e., 28 to 56 volts, to the bases 31b and 32b has the effect of cutting off the conduction of the transistor 31 and 32, respectively.

The resistor 35 and capacitor 38 connected to the base 31b provide a time delay in applying a signal voltage to the base 31b for cutting off the transistor 31. This time delay is provided so as to prevent switching of more than one pair of rectifiers by any one timing pulse. The switching action of the controlled rectifiers is comparatively fast, and since the pulses from a timing generator 11 have a finite width, it is conceivable that a second "and" gate could be conditioned to conduct and triggered by a single pulse. The RC time constant of the resistor 35 and capacitor 38 is sufficiently long to prevent such an occurrence. The resistor 36 and capacitor 39 are provided for the same purpose.

To more completely understand the operation of the controlled rectifier transistor 44, reference should be had to Fig. 7 which illustrates its construction. From this figure, it is to be noted that the transistor is of the PNPN-type with the anode comprising a P-type region on one end and the cathode an N-type region on the other. The gate is connected to the P-type region adjacent to the cathode. In a non-conductive condition, the voltage applied between the anode and cathode is distributed evenly across the three junctions between the P and N regions. A positive pulse applied to the gate injects carriers into the P-type region breaking down the voltage across two of the junctions. When this occurs, current conduction begins, in the nature of an avalanche breakdown, between the anode and the cathode. The transistor continues to conduct until the voltage at the anode is reduced. In this respect, the transistor operates in the manner of a thyratron, in that once it is triggered into conduction, it continues to conduct until the positive voltage on the anode 6 is removed, and any signal applied to the date region has no effect while it is conducting.

The shaping coil 50, connected to the center tap of the primary winding 49 is inserted for the purpose of shaping the voltage output wave generated by the controlled rectifiers 16 and 17. In the absence of the transformer winding 49 and the shaping coil 50, the voltages appearing at the outputs would be in the form of a square wave, as shown in Fig. 4. The inductive effects of the primary winding 49 and the coil 50 inhibit any rapid change in current flowing through them, and therefore distort the square voltage wave into a shape more nearly resembling a sine wave.

Referring to Fig. 8, there is illustrated a schematic diagram of a relaxation-type oscillator that may be used as the timing pulse generator 11. The circuit comprises a unijunction transistor 60, resistors 61 and 62, and capacitors 63 and 64. The transistor 60 has an emitter 65 and bases 66 and 67. The base 66 is connected through the resistor 62 to a positive 28 volt D.C. source. The emitter 65 is connected through the resistor 61 to the same D.C. source. The emitter 65 is also connected to one side of the capacitor 64 and to one side of the capacitor 63. The other side of the capacitor 63 is connected to the base 67 and to ground; and the other side of the capacitor 64 is connected to the timing line 26.

The transistor 60 has a negative resistance characteristic, and within a certain operating range, it has a state of low or negligible conduction and a state of high conduction. The resistor 62 connected to the base 66 functions to linearize the operation of the transistor 60 over a desired temperature range.

In operation, the oscillator circuit functions to generate an output in the form of a series of spiked pulses having a magnitude of approximately minus 14 volts. The oscillator is of the relaxation type, and its frequency of oscillation is determined primarily by the RC time constant of the resistor 61 and capacitor 63. The capacitor 63 is charged by current flowing through the resistor 61 from the D.C. source. When the positive voltage across the capacitor 63 reaches a predetermined value, the transistor 60 goes into a state of high conduction and discharges the capacitor 63 through the emitter 65 and base 67 to ground. The sudden drop in voltage across the capacitor 63 is coupled through the capacitor 64 to the timing line 26. The transistor 60 returns to its low conduction state during the charging time, and the step is then repeated.

It should be understood that the oscillator circuit shown and described is by way of example only, and any suitable circuit giving the desired output may be used.

The components utilized in the circuits shown and described above preferably may be of the types or have values as follows.

"And" circuit 22:
  Transistor 30 _____ 2N365, p-n-p type
  Transistors 31, 32 _____ 2N369, n-p-n type
  Resistor 33 _____ohms__ 200
  Resistor 34 _____do____ 1,000
  Resistors 35, 36 _____do____ 5,600
  Capacitor 37 _____mfd__ .1
  Capacitors 38, 39 _____mfd__ .03
  Resistor 43 _____ohms__ 1,300

Rectifier circuits 16 and 17:
  Transistors 44, 45 _____ ZJ39A–75
  Crystal diodes 46, 47 _____ HD6006
  Capacitor 48 _____mfd__ 10
  Coil 50 _____mh__ .25

Timing pulse generator circuit 11:
  Transistor 60 _____ 2N491
  Resistor 61 _____ohms__ 10K
  Resistor 62 _____do____ 180
  Capacitor 63 _____mfd__ .05
  Capacitor 64 _____mfd__ .01

There has been provided by this invention an improved static inverter for converting a D.C. voltage into a polyphase A.C. voltage. The conversion is accomplished by utilizing a timing pulse generator in combination with a logic control circuit for developing a fluctuating D.C. voltage from the D.C. source. The fluctuating D.C. voltage is applied to the primary windings of a power transformer and is transformed into a polyphase A.C. voltage at the output windings.

The logic control circuit employs a plurality of controlled rectifier type transistors, the conduction of which are controlled by the timing generator and a plurality of "and" gate circuits. The controlled rectifiers employed serve a dual purpose, first in supplying a comparatively high current to the primary windings of the power transformer and, secondly, in performing a memory function by providing an output signal which is fed back to the "and" gates for controlling their conduction. The conduction of the rectifiers is controlled exclusively by signals from the "and" gates, and fluctuations in load conditions have no effect on this conduction. The power output of the inverter is determined by the current carrying capacities of the rectifiers and by the magnitude of the D.C. voltage used as a source.

The frequency output is determined by the timing pulse generator and if a precision frequency is desired, it is contemplated that a crystal oscillator or other stable frequency device may be used that is capable of providing the desired timing pulse.

It is further contemplated that the entire inverter, with the exception of the input and output terminals, may be mounted on printed circuits and sealed within a suitable container and potted with paraffin or other suitable potting material. Such a construction should render the circuit relatively free from environmental conditions and substantially shockproof.

I wish it to be understood that my invention is not to be limited to the specific constructions and arrangements shown and described except only insofar as the appended claims may be so limited, as it will be apparent to those skilled in the art that changes may be made without departing from the principles of the invention.

I claim:

1. In an electrical circuit for converting voltage from a direct current source into polyphase alternating current voltage and delivering the alternating voltage through a polyphase power output transformer, the combination of controlled current conducting means connected to the direct current source and to the output transformer, and logic control means for controlling the conduction of said conducting means in accordance with a predetermined sequence, said last named means including a plurality of gate circuits connected to said conducting means and adapted to be conditioned for conduction according to said sequence, and timing means for triggering said gate circuit into conduction and thereby control the conduction of said conducting means.

2. In an electrical circuit, the combination of controlled current conducting means, gate circuit means for controlling the conduction of said conducting means, feed back means connected to said conducting means for conditioning said gate circuit means for conduction according to a predetermined sequence, and timing means for triggering said gate circuit means into conduction.

3. In a polyphase static inverter for converting direct current voltage into a polyphase alternating current voltage, the combination of timing pulse generating means, a plurality of gate circuits connected to said timing means and adapted to be triggered into conduction thereby; a plurality of controlled rectifiers connected to said gate circuits and adapted to be triggered into conduction by signals from said gate circuits, feedback means connecting said rectifiers with said gate circuits for conditioning them for conduction, power output means connected to said controlled rectifiers, and a source of direct current voltage for energizing said rectifiers.

4. In a device for converting direct current voltage into alternating current voltage, the combination of a source of direct current voltage; a plurality of pairs of controlled rectifier type transistors with each pair being connected in a push-pull manner and each transistor having an input connection and an output connection; power output means connected to said source of direct current voltage and to the output connections of said transistors; gate circuit means connected to the input connections of said transistors, said gate circuit means also being connected to the output connections of said transistors for conditioning said gate circuits for conduction; and timing means connected to said gate circuits for triggering said gate circuits into conduction.

5. In a device for converting direct current voltage into alternate current voltage, the combination of a source of direct current voltage, a plurality of pairs of controlled rectifier type transistors with each pair of transistors connected in a push-pull manner, power output means connected to said source and to said transistors, gate circuit means for controlling the conduction of said transistors, feedback means for said transistors for conditioning said gate circuits for conduction, and timing pulse generating means connected to said gate circuits for triggering them into conduction.

6. In an electrical circuit, the combination of a plurality of controlled current conducting means, each having an input connection and an output connection; a plurality of gate circuit means, each having three input connections and one output connection, with the one output connection being connected to the input of one of said conducting means and two of said input connections being connected to the outputs of two other conducting means; and timing means connected to said third input for triggering said gate circuit into conduction when signals are applied simultaneously to said other two inputs from said conducting means.

7. In an electrical circuit, the combination of controlled current conducting means having input connections and output connections, gate circuit means having an output connection connected to one input of said controlled conducting means for controlling the conduction thereof; and timing pulse generating means for triggering said gate circuit means into conduction, said gate circuit means comprising two p-n-p type transistors and one n-p-n type transistor with each transistor having an emitter, collector, and base, time delay means connected to the bases of the p-n-p type transistors, and a common tie-line connecting together the emitters of each of said p-n-p type transistors and the collector of said n-p-n type transistor, the base of said n-p-n type transistor being connected to said timing pulse generating means, and said common tie-line being connected to said one input connection of said conducting means, said time delay means each being connected to output connections of said conducting means and being effective to delay conditioning of said p-n-p type transistors for conduction for a predetermined time.

8. In a static inverter for converting direct current voltage into three phase alternating current voltage, the combination of a source of direct current voltage; power transformer having three primary windings connected to said source; three pairs of controlled rectifier type transistors with each pair connected in push-pull and each transistor having an input connection and an output connection, said output connections being connected to said primary windings; six gate circuits each having three input connections and an output connection with said output connection being connected to the input of one of said transistors and two of said gate input connections each being connected to the output connection of two other of said transistors; and timing pulse generating means connected to the third of said input connections of said gate circuits, said gate circuits being adapted to be conditioned for conduction by signals received simultaneously from the outputs of said transistors and triggered into conduction by pulses from said pulse generating means for thereby causing said transistors to conduct in accordance with a predetermined sequence.

References Cited in the file of this patent

UNITED STATES PATENTS

| | | |
|---|---|---|
| 2,570,651 | Demuth | Oct. 9, 1951 |
| 2,575,600 | Smith | Nov. 20, 1951 |
| 2,618,772 | Bunblasky | Nov. 18, 1952 |